US006197892B1

(12) United States Patent
Weiss et al.

(10) Patent No.: US 6,197,892 B1
(45) Date of Patent: Mar. 6, 2001

(54) FUNCTIONALIZED POLYMERS

(75) Inventors: Robert Weiss, Kirchheim; Axel Gottschalk, Neustadt, both of (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/142,657

(22) PCT Filed: Mar. 12, 1997

(86) PCT No.: PCT/EP97/01259

§ 371 Date: Sep. 14, 1998

§ 102(e) Date: Sep. 14, 1998

(87) PCT Pub. No.: WO97/34936

PCT Pub. Date: Sep. 25, 1997

(30) Foreign Application Priority Data

Mar. 15, 1996 (DE) .............................. 196 10 362

(51) Int. Cl.$^7$ ...................................... C08F 8/00
(52) U.S. Cl. .................. 525/333.3; 525/359.2; 525/386
(58) Field of Search ............... 525/333.3, 359.2, 525/386

(56) References Cited

U.S. PATENT DOCUMENTS

| 4,145,298 | 3/1979 | Trepka . |
| 4,202,944 | 5/1980 | Hancock et al. . |
| 4,948,650 | 8/1990 | Fitzgerald et al. . |

FOREIGN PATENT DOCUMENTS

| 31 18 629 | 11/1982 | (DE) . |
| 195 19855 | 12/1996 | (DE) . |
| 214 400 | 3/1987 | (EP) . |
| 319 833 | 6/1989 | (EP) . |
| 78 25747 | 4/1979 | (FR) . |
| 90/15086 | 12/1990 | (WO) . |
| 96/38489 | 12/1996 | (WO) . |
| 97/34936 | 9/1997 | (WO) . |

OTHER PUBLICATIONS

J. Poly. Sci, Part A, Pol. Chem., vol. 29, 1329–1338 (1991) (erroneously dated in spec. as 1993).
Polymer Preprints, vol. 33, No. 2, Aug. 1992, 608–609.
Polymer Preprints, vol. 33, No. 1, Apr. 1992, 944–945.

*Primary Examiner*—Bernard Lipman
(74) *Attorney, Agent, or Firm*—Keil & Weinkauf

(57) ABSTRACT

A functionalized polymer of the formula

A—Z—X where
  A is a block of vinylaromatic monomers of 8 to 20, preferably 8 to 12, carbon atoms,
  Z is a basic building block of a compound having sterically hindering groups and
  X is a functionalized basic building block,
the degree of functionalization of the polymer being at least 65%, preferably greater than 85%, particularly preferably at least 90%, a process for its preparation, thermoplastic molding materials containing said polymer, processes for their preparation, the use for the production of moldings, and moldings containing said molding materials.

17 Claims, No Drawings

FUNCTIONALIZED POLYMERS

The present invention relates to a functionalized polymer of the formula

A—Z—X where
A is a block of vinylaromatic monomers of 8 to 20, preferably 8 to 12, carbon atoms,
Z is a basic building block comprising a compound having sterically hindering groups and
X is a functionalized basic building block,
wherein the degree of functionalization of the polymer is at least 65%, preferably greater than 85%, particularly preferably at least 90%.

The preparation of terminal anhydride-functionalized polystyrene is described in Park, J. W., Barlow, and Paul "Terminal Anhydride Functionalization of Polystyrene", J. Polym. Sci., Part A, Polymer Chemistry, 29 (1993), 1329–1338. Styrene is subjected to anionic polymerization, and the polystyryllithium formed is coupled directly with trimellitic anhydride chloride (TMAC) at the end of the anionic polymerization of styrene. The degree of functionalization of the polymer is not more than 61% in this direct functionalization. Polystyrenes functionalized with TMAC were also obtained by reacting hydroxyl-terminated polystyrene and TMAC. In this reaction for indirect functionalization, degrees of functionalization of up to 85% are achieved. However, the feasibility of this process depends on the availability of hydroxyl-terminated polymer, which is obtainable by anionic polymerization and subsequent reaction with ethylene oxide at the end of the polymerization (R. P. Quirk and J.-J. Ma, J. Polym. Sci. Polym. Chem. Ed. 26 (1988) 2031). Polystyrenes functionalized in this manner to can be used for the in situ formation of block copolymers in polymer blends for compatibilization of the polymer blend components.

The indirect functionalization has the disadvantage that ethylene oxide, which is toxicologically unsafe, must be used in the process.

Reinforced blends of PPE and high impact polystyrene, which are used as molding materials in many areas of industry, are known per se. In many applications, high tensile strength and flowability of the material are decisive.

DE 31 18 629 A1 discloses molding materials of polyphenylene ethers and toughened styrene polymers, which molding materials contain a polyorganosiloxane as a further component for imparting good flowability to the molding material. If these molding materials are reinforced, the rigidity of the reinforced molding material is not sufficiently high for all applications.

EP-B1 0 214 400 describes resin compositions of polyphenylene ether resin and styrene resin, which additionally comprise a cyclopentadiene resin which contains a polar group, in order to improve the flowability of the resin composition. In this resin composition, too, the mechanical properties are unsatisfactory for many applications.

EP-A 0 319 833 describes reinforced thermoplastic molding materials which contain polyphenylene ether, a toughened styrene polymer and a further copolymer of styrene and tert-butyl acrylate. The copolymer of styrene and tert-butyl acrylate serves for improving the mechanical properties, but the molding material has insufficient flowability.

It is an object of the present invention to provide a functionalized polymer of vinylaromatic monomers, the degree of functionalization being very high.

It is a further object of the present invention to provide a functionalized polymer of vinylaromatic monomers, the functionalization comprising no ethylene oxide basic building blocks.

It is a further object of the present invention to provide a process for the preparation of the functionalized polymers having a high degree of functionalization.

It is a further object of the present invention to provide a process for the preparation of the functionalized polymers having a high degree of functionalization, the use of the toxicologically unsafe ethylene oxide being dispensed with.

It is a further object of the present invention to provide reinforced thermoplastic molding materials which have high rigidity.

It is a further object of the present invention to provide reinforced thermoplastic molding materials which have very good tensile strength and at the same time flowability.

It is a further object of the present invention to provide thermoplastic molding materials which have high rigidity.

It is a further object of the present invention to provide thermoplastic molding materials which have great toughness or impact strength.

It is a further object of the present invention to provide a process for the preparation of these (reinforced) thermoplastic molding materials.

It is a further object of the present invention to provide moldings which have good rigidity and tensile strength.

We have found that these and further objects are achieved by a functionalized polymer as defined at the outset, by a process for its preparation, by (reinforced) thermoplastic molding materials, by processes for their preparation and by moldings as defined in the following. Preferred functionalized polymers are described as well in the following. Uses of the functionalized polymer and of the (reinforced) thermoplastic molding materials are described as well.

Functionalized Polymer (component (a))

The novel functionalized polymer is of the formula

A—Z—X where
A is a block of vinylaromatic monomers of 8 to 20, preferably 8 to 12, carbon atoms,
Z is a basic building block comprising a compound having sterically hindering groups and
X is a functionalized basic building block,
wherein the degree of functionalization of the polymer is at least 65%, preferably greater than 85%, particularly preferably at least 90%.

According to the invention, the block A may be composed of one type or a plurality of types of vinylaromatic monomers, ie. may be homopolymer or copolymer.

A group of monomers which can be used according to the invention of A comprises styrene monomers. Styrene monomers may be unsubstituted or may be substituted by $C_1$–$C_{12}$-alkyl, preferably $C_1$–$C_{14}$-alkyl, on the aromatic nucleus or on the vinyl group. One or more straight-chain or branched alkyl radicals may be present as substituents. It is also possible for both the aromatic nucleus (benzene nucleus) and the vinyl group of the styrene monomers to be substituted.

Examples of styrenes which may be used according to the invention are styrene, α-methylstyrene, p-methylstyrene, vinyltoluene and p-tert-butylstyrene, particularly preferably styrene.

Vinylaromatic monomers which contain a polynuclear aromatic radical bonded to the vinyl group may also be used.

A suitable radical is, for example, naphthyl, which may be unsubstituted or alkyl-substituted as described above.

Z is a basic building block of a compound having sterically hindering (bulky) groups.

The compound is preferably a vinyl monomer which is substituted by sterically hindering groups at least on a carbon atom. Preferably, the vinyl group is substituted on a carbon atom by two aromatic radicals, preferably by vinyl radicals, which in turn may be substituted by the alkyl radicals described above for the monomers of the block A and further substituents. For example, alkyl of, preferably, 1–4 carbon atoms which in turn may be unsubstituted or substituted as described may be bonded to the other carbon atom of the vinyl group. According to an embodiment of the invention, the vinyl group substituted by sterically hindering groups has a total of 14–22 carbon atoms.

Thus, the basic building block Z is preferably diaryl alkylene of 14 to 22 carbon atoms, in particular 1,1-diarylethylene of the formula

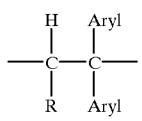

where R is hydrogen or alkyl of 1 to 4 carbon atoms and Aryl is aryl of 6 to 10 carbon atoms, preferably phenyl.

X is a functionalized basic building block. According to an embodiment of the invention, the functional group(s) is/are such that they can form a strong bond, in particular a covalent bond, to a reinforcing agent, preferably a glass fiber or silanized glass fiber, in a molding material, as described below for the molding materials.

The functional group by means of which the covalent bond to the basic building block Z is achieved may be any desired functional group suitable for this purpose. It is preferably hydroxyl or halogen, preferably chlorine. The functional group X is preferably a hydrocarbon group carrying an acid anhydride group, in particular aryl carrying an acid anhydride group. The functional group is bonded to the carbon atom which also carries the aryl radicals. The functional group X is an anhydride group or an acid anhydride group. The anhydride group and the acid anhydride group are preferably of 2 to 8 carbon atoms. Preferred examples of the functional group X are the acid anhydride radicals derived from trimellitic acid.

According to one embodiment, this functional group serves for forming a strong bond, in particular a covalent bond, to a reinforcing agent, preferably a glass fiber or silanized glass fiber in a molding material, as described below. The difunctional or polyfunctional compound of the functionalized basic building block X may contain, for example, OH, COOH, COOR, SH, NCO or $NH_2$ as this functional group. It preferably contains an $NH_2$ group or an acid anhydride group, in particular the latter.

According to an embodiment of the invention, a difunctional or polyfunctional compound which introduces the functionalized basic building block X may be of the formula

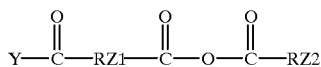

where RZ1 and RZ2 are each a hydrocarbon radical of, preferably, 1 to 10 carbon atoms, and RZ1 and RZ2 together may also form a hydrocarbon ring structure, in particular an aromatic ring, preferably a benzene ring, or a cycloalkyl ring, the two carbon atoms of the acid anhydride group preferably being bonded to neighboring carbon atoms of the ring structure. Y is hydroxyl or halogen, preferably chlorine. Preferred examples of the functionalized basic building block X are the acid anhydride radical derived from trimellitic acid, in particular in the following configurations:

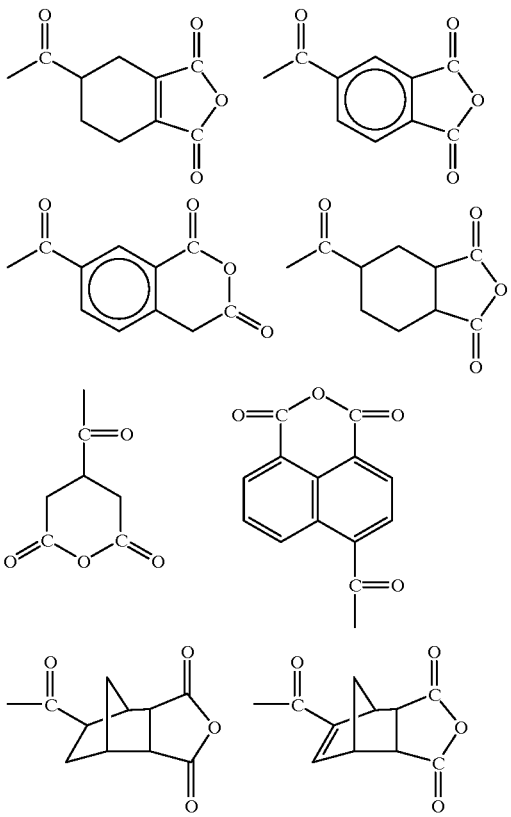

The 1,2-anhydride or 1,2-anhydride chloride of 1,2,4-benzenetricarboxylic acid (trimellitic acid) or chloroethanoylsuccinic anhydride, chloroformylsuccinic anhydride or 1-acetoxyacetyl-3,4-phthalic anhydride is preferably used as the difunctional or polyfunctional compound introducing the basic building block X, trimellitic anhydride chloride being particularly preferred. Other compounds which have both an acid anhydride function and an acid halide or acid function may also be used according to the invention for the preparation of the functionalized polymer.

According to an embodiment of the invention, the basic building blocks Z and X preferably contain no ethylene oxide basic building blocks which are present in the main chain. According to the invention, the weight average molecular weight of the functionalized polymer is preferably from 10,000 to 300,000, in particular from 20,000 to 100,000. The molecular weight is determined with the aid of gel permeation chromatography against polystyrene calibration standards.

The degree of functionalization of the functionalized polymer is determined by $^1$H-NMR, but may also be determined by potentiometry or by titration against bases using suitable indicators.

Preparation of the Functionalized Polymer

It has been found, according to the invention, that the functionalized polymers having a relatively high degree of functionalization are obtained when the living anion of block A is first reacted with compounds, such as 1,1-diphenylethylene, carrying sterically hindering groups and the product obtained is reacted with a difunctional or polyfunctional compound, such as trimellitic anhydride chloride. The degree of functionalization, which can be determined by IR spectroscopy or titration is preferably greater than 85%, particularly preferably at least 90%, in this procedure.

In contrast to the indirect functionalization route described by Park, Barlow and Paul, it is possible to dispense with the use of ethylene oxide, which is toxicologically unsafe. In contrast, the diphenyl ethylene used according to the invention is toxicologically safe.

A functionalized polymer as described above can be prepared by a process in which a) vinylaromatic monomers are subjected to anionic polymerization to give a first living polymer of the formula A⁻ containing a Block A, b) the first living polymer is reacted with a compound having sterically hindering groups to give a second living polymer of the formula A—Z⁻ and c) the second living polymer is reacted with a difunctional or polyfunctional compound to give a polymer of the formula A—Z—X, the abbreviations used here having the same meanings as in the polymer claims.

Anionic polymerization processes for the preparation of block A are described in detail, for example, in U.S. Pat. No. 3,251,905, 3,390,207, 3,598,887 and 4,219,627. Suitable initiators for the polymerization are organo-alkali metal compounds, preferably lithium alkyls, eg. methyllithium, ethyllithium, n-butyllithium, sec-butyllithium or isopropyllithium. n-Butyllithium or sec-butyllithium is particularly preferably used.

The preparation of other mono- or bifunctional anionic polymers is also known and has been described, inter alia, in EP 0 303 177, EP 0 295 675, U.S. Pat. No. 4,950,721, DE 36 39 569 and DE 35 37 771.

Particularly suitable solvents for the anionic polymerization for the preparation of novel functionalized polymers are straight-chained or branched aliphatic hydrocarbons, eg. n-octane or n-hexane, and unsubstituted or substituted cycloaliphatic and aromatic hydrocarbons, eg. cyclohexane, methylcyclohexane, toluene or benzene, and any desired mixture of the aliphatic, cycloaliphatic and aromatic hydrocarbons. Cyclohexane is preferably used as the solvent.

Other suitable solvent components are ethers, such as tetrahydrofuran or diethyl ether, and tertiary amines, eg. tetramethylethylenediamine or pyridine, in concentrations of from 0.01 to 20, preferably from 0.01 to 2, % by weight. Tetrahydrofuran is preferred.

All starting materials must be freed from oxygen-active and protic impurities, this being possible, for example, by bringing into contact with metal organyls or by adsorptive purification, for example with calcium hydride. The polymerization is preferably carried out under inert gas conditions of from −100 to +120° C., preferably from −80 to +80° C.

According to an embodiment of the present invention, novel polymers can be prepared by first producing the parent structure

as a living polymer in a manner known per se by anionic polymerization, preferably with the use of lithium initiators, in particular an alkyllithium, particularly preferably n-butyllithium or secondary butyllithium. This living polymer is then reacted in a second stage with a compound of the formula

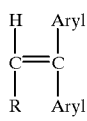

with the preparation of a second living polymer.

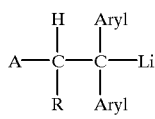

This further living polymer is finally reacted in a further stage with a difunctional or polyfunctional compound which introduces a functionalized basic building block X. One functional group permits covalent bonding of the basic building block X to Z, and at least one further functional group ensures the functionalization of the basic building block and hence of the polymer. If, according to the invention, the difunctional or polyfunctional compound has, for example, a hydroxyl group or a halogen atom, preferably a chlorine atom, preferably in an acid group or acyl chloride group, as a functional group which permits bonding to the basic building block Z, a halide ion or an OH⁻ ion is eliminated with formation of a covalent bond between the basic building block Z and the functionalized basic building block X. The uncharged functionalized polymer of the invention is formed, the functionalization of which is as described above.

The individual stages of the novel process are preferably carried out under the following conditions:

(a) The polymerization of the vinylaromatic compound with a lithium initiator is carried out at from −100 to 100° C., preferably from −20 to 80° C.

(b) The reaction of the living polymer with CHR=CAryl₂ is likewise carried out at from −100 to 100° C., preferably from −20 to 80° C.

(c) The introduction of the functional group into the further living polymer with elimination of the lithium is carried out at from −100 to 50° C., preferably from −20 to 30° C.

In order to isolate the polymer, the polymerization mixture can be either directly heated for drying or treated with steam by known methods, the solvent being distilled off. It may also be precipitated in an excess of a non-solvent, eg. ethanol, and separated off mechanically and dried or worked up by devolatilization in an extruder.

The reaction mixture is worked up, for example, by precipitation of the functionalized polymer with petroleum ether, filtration under suction and drying of the precipitate.

According to an embodiment of the invention, the functionalized polymer has a block A of vinylaromatic monomers which is compatible with polyphenylene ether and polystyrene. The compatibility of two polymer components is understood in general as meaning the miscibility of the components or the tendency of one polymer to dissolve in the other polymer component (cf. B. Vollmert, Grundriß der Makromolekularen Chemie, Volume IV, page 222 et seq., E. Vollmert Verlag, 1979). Two polymers are all the more compatible the smaller the difference between their solubility parameters. Such parameters and the enthalpy of mixing cannot be determined in a standard manner for all polymers, so that the solubility can be determined only indirectly, for example by torsion/vibration or DTA measurements. Examples of preferred vinylaromatic polymers compatible with polyphenylene ethers are given in the monograph by O. Olabisi, Polymer-Polymer Miscibility, 1979, pages 224 to 330 and 245. The functionalized basic building block X is capable of forming a bond with reinforcing agents, such as glass fibers or silanized glass fibers, in order to bind these firmly. Consequently, the functionalized polymer can be used in polyphenylene ether/polystyrene blends, which may contain reinforcing agents, and can be used for the preparation of unreinforced or reinforced thermoplastic molding materials.

Thermoplastic Molding Materials Containing Polyphenylene Ether

We have found that the objects of the present invention are achieved by the thermoplastic molding material described in the claims, reinforced according to an embodiment and containing polyphenylene ether. Said molding material contains (a) from 0.1 to 20% by weight of at least one functionalized polymer, as defined in any of the polymer claims, (b) from 1 to 98.9% by weight of at least polyphenylene ether, (c) from 1 to 98.9% by weight of at least one vinylaromatic polymer, (d) from 0 to 50% by weight of at least one reinforcing agent and (e) from 0 to 60% by weight of further additives and/or processing assistants, the amounts of components (a) to (e) together summing to 100% by weight.

Preferably, novel, unreinforced or reinforced, thermoplastic molding materials contain 0.2–15, in particular 0.5–10%, by weight of component (a), 1–97.9, particularly preferably 20–89.9, in particular 35–79.5%, by weight of component (b), 1–97.9, particularly preferably 5–60, in particular 10–45%, by weight of component (c), 1–50, particularly preferably 5–45, in particular 10–40%, by weight of component (d) and 0–30, in particular 0–20%, by weight of component (e).

The amounts of components (a)–(e) together always sum to 100% by weight.

The individual components are described in more detail below.

Polyphenylene Ether of Component (b)

The polyphenylene ether of component (b) is present in the novel reinforced thermoplastic molding materials in an amount of from 1 to 98.9, preferably from 1 to 97.9, particularly preferably from 20 to 89.9, in particular from 40 to 79.5%, by weight, based on the reinforced thermoplastic molding materials. The polyphenylene ethers (b) contained in the novel molding materials are known per se. They are prepared by conventional methods by oxidative coupling of phenols disubstituted in the ortho position by alkyl, alkoxy, chlorine or bromine (cf. U.S. Pat. No. 3,661,848, 3,378,505, 3,306,874, 3,306,875 and 3,639,656). The alkyl or alkoxy groups, which are preferably of 1 to 4 carbon atoms but contain no alpha tertiary hydrogen atom, may in turn be substituted by chlorine or bromine. Examples of suitable polyphenylene ethers are poly-2,6-diethyl-1,4-phenylene ether, poly-2-methyl-6-ethyl-1,4-phenylene ether, poly-2-methyl-6-propyl-1,4-phenylene ether, poly-2,6-dipropyl-1,4-phenylene ether, poly-2-ethyl-6-propyl-1,4-phenylene ether, poly-2,6-dichloro-1,4-phenylene ether and poly-2,6-dibromo-1,4-phenylene ether and copolymers such as those which contain 2,3,6-trimethylphenol, as well as polymer blends. Poly-2,6-dimethyl-1,4-phenylene ether is preferred. The polyphenylene ethers generally have a relative viscosity of from 0.3 to 0.7 dl/g, measured in 1% strength by weight solution in chloroform at 25° C.

Preferably used polyphenylene ethers are those which are compatible with vinylaromatic polymers, i.e. completely or very substantially soluble in these polymers (cf. A. Noshay, Block Copolymers, pages 8 to 10, Academic Press, 1977, and O. Olabisi, Polymer-Polymer Miscibility, 1979, pages 117 to 189).

Graft copolymers, of polyphenylene ethers and vinylaromatic polymers, such as styrene, alpha-methylstyrene, vinyltoluene and chlorostyrene may also be used as polyphenylene ether component (b).

For the purposes of the present invention, modified polyphenylene ethers may be used, as disclosed, for example, in WO 86/2086, WO 87/0540, EP-A 222 246, EP-A 223 116 and EP-A 254 048.

Vinylaromatic Polymers of Component (c)

The vinylaromatic polymers are used, according to the invention, in amounts of from 1 to 98.9, preferably from 1 to 97.9, particularly preferably from 5 to 60, in particular from 10 to 45, % by weight, based on the reinforced thermoplastic molding material.

Vinylaromatic polymers, in particular polystyrenes, of component (c) are known per se, for example from EP-A-0 319 833.

Examples of suitable vinylaromatic polymers are all conventional homo- and copolymers of styrene. Usually, the weight average molecular weights ($M_w$) of the commonly used styrene polymers are from 150,000 to 300,000. Suitable styrene polymers are prepared predominantly from styrene, as well as from styrenes substituted by $C_1$–$C_4$-alkyl on the nucleus or side chain, such as alpha-methylstyrene or p-methylstyrene, by the known mass, solution or suspension methods (cf. Ullmanns Enzyklopädie der technischen Chemie, Volume 19, pages 265 to 272, Verlag Chemie, Weinheim 1980).

The vinylaromatic polymers of component (c) may also be toughened by admixing small amounts, preferably from 2 to 20% by weight, based on the styrene polymer, of an acrylate rubber or of a polymer of a conjugated diene, such as butadiene or isoprene. The diene polymers may be partially or completely hydrogenated. The rubber and the diene polymer should have a glass transition temperature of less than 0° C., measured according to K. H. Illers and H. Breuer, Kolloidzeitschrift 176 (1961), page 100. Conventional rubbers such as polybutadiene rubber, acrylate rubber, styrene/butadiene rubber, hydrogenated styrene/butadiene rubber, acrylonitrile/butadiene rubber, polyisoprene rubber, ionomers, styrene/butadiene block copolymers, including AB, ABA and ABAB tapered block copolymers, star block copolymers and the like, similar isoprene block copolymers and in particular (partially) hydrogenated block copolymers, as disclosed per se in EP-A-62 283, are suitable. Such synthetic rubbers are familiar to persons skilled in the art and are summarized, together with the unsuitable EPDM rubbers, in Ullmanns Enzyklopädie der technischen Chemie, 4th edition, Volume 13, pages 595 to 634, Verlag Chemie GmbH, 1977.

The toughening can also be achieved in a preferred manner by preparing the styrene polymers in the presence of relatively small amounts, eg. from 2 to 20% by weight, based on the styrene polymer, of an elastomeric polymer based on a conjugated diene, if necessary of an acrylate rubber (HIPS). Elastomeric polymers based on butadiene, eg. styrene/butadiene polymers, polybutadiene and also butadiene/styrene block copolymers, are suitable. These styrene polymers toughened in a specific manner are familiar from literature and practice to a person skilled in the art so that further explanation appears superfluous at this point (cf. Ullmanns Enzyklopädie der technischen Chemie, 4th edition, Volume 19, pages 272 to 295, Verlag Chemie GmbH, 1980).

Suitable high impact polystyrenes are described, for example, in DE 31 18 629 A1, as are processes for their preparation.

Reinforcing Agents of Component (d)

According to an embodiment of the invention, the polyphenylene ether-containing molding materials may be free of reinforcing agents.

According to a further embodiment of the invention, however, the polyphenylene ether-containing molding materials contain a reinforcing agent. This embodiment is described below.

The reinforcing agents are used, according to the invention, in amounts of from 1 to 50, preferably from 5 to 45, in particular from 10 to 40, % by weight, based on the reinforced thermoplastic molding material.

The novel molding materials contain, as component (d), conventional reinforcing materials, such as glass fibers, glass beads, mineral fibers, alumina fibers, carbon fibers, potassium titanate whiskers or aramid fibers. Carbon fibers, potassium titanate whiskers, aramid fibers and glass fibers are preferred, in particular glass fibers.

The glass fibers may comprise E, A or C glass. Their diameter is in general from 6 to 20 μm. Both rovings and chopped glass fibers having a length of from I to 10 mm, preferably from 3 to 6 mm, or milled glass fibers having a length of from 0.05 to 1.5 mm may be used.

According to an embodiment of the present invention, the reinforcing agents of component (d) are untreated.

According to a further preferred embodiment of the invention, the reinforcing agents of component (d) are coated or sized. This coat or size covers the reinforcing agents of component (d), in particular the glass fibers, preferably uniformly over the entire surface.

According to an embodiment of the invention, the coat or size comprises a silane compound. Suitable silane compounds are those of the general formula

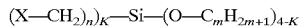

where

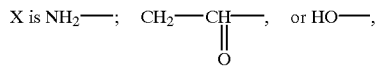

n is an integer from 2 to 10, preferably 3 or 4, m is an integer from 1 to 5, preferably 1 or 2

K is an integer from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes which contain glycidyl as substituent X.

The silane compounds are used for surface coating in general in amounts of from 0.05 to 5, preferably from 0.5 to 1.5, in particular from 0.8 to 1, % by weight (based on the reinforcing agents of component (d)).

The coated or sized reinforcing agents of component (d), preferably the glass fibers coated or sized as above, can be particularly readily reacted with the functionalized polymer of component (a). This results in a strong bond between the functionalized polymer of component (a) and the reinforcing agent (d), in particular the glass fibers. Since the polymer block A of the functionalized polymer is compatible with the polyphenylene ether of component (b) and the vinylaromatic polymer of component (c), the reinforcing agents of component (d) are thoroughly distributed in the novel molding materials and intimately bonded therewith, which leads to improved tensile strength and a high modulus of elasticity.

Additives and Processing Assistants of Component (e)

The conventional additives and/or processing assistants used as component (e) are employed in amounts from 0 to 60, preferably from 0 to 30, in particular from 0 to 20, % by weight, based on the reinforced thermoplastic molding material.

Particularly suitable conventional additives and processing assistants are particulate fillers, antioxidants, flameproofing agents, conventional heat and light stabilizers, lubricants and mold release agents, colorants, dyes, plasticizers and pigments in conventional amounts. Polymers other than the stated ones, for example vinylaromatic-based polymers, polyamides as described, for example, below as component (f) and/or rubbers, may be added to the novel reinforced molding materials.

Particulate fillers as constituents of component (e) are preferably selected from the following group: amorphous silica, magnesium carbonate, powdered quartz, mica, talc, feldspar, wollastonite and kaolin, in particular calcined kaolin.

Preferred combinations of components (d) and (e) are, for example, 20% by weight of glass fibers with 15% by weight of wollastonite, and 15% by weight of glass fibers with 15% by weight of wollastonite. The stated percentages by weight are based in each case on the total components (a) to (e).

Finally, other preferred reinforced thermoplastic molding materials are those which contain, as parts of component (e), flameproofing agents selected from the following group: polyhalobiphenyl, polyhalodiphenyl ether, polyhalophthalic acid and derivatives thereof, polyhalooligocarbonates, polyhalopolycarbonates and phosphorus compounds.

Examples of flameproofing agents are polymers of 2,6,2', 6'-tetrabromobisphenol A, of tetrabromophthalic acid, of 2,6-dibromophenol and of 2,4,6-tribromophenol and of derivatives thereof.

A preferred flameproofing agent is elemental phosphorous. As a rule, the elemental phosphorus may be desensitized or coated with, for example, polyurethanes or aminoplasts. Masterbatches of red phosphorus, for example in a polyamide, elastomer or polyolefin, are also suitable. Combinations of elemental phosphorus with 1,2,3,4,7,8,9,10,13, 13,14, 14-dodecachloro-1,4,4a,5,6,6a,7,10,10a,11,12,12a-dodecahydro-1,4:7,10-dimethanodibenzo(a,e)cyclooctane and, if required, a synergistic agent, eg. antimony trioxide, are particularly preferred.

Phosphorus compounds, such as organic phosphates, phosphonates, phosphinates, phosphine oxides, phosphines or phosphites, are also preferred. Examples are triphenylphosphine oxide, triphenyl phosphate and resorcinol-bistriphenylphosphine oxide. This may be used alone or as a mixture with hexabromobenzine or a chlorinated biphenyl and, if desired, antimony oxide.

Typical of the preferred phosphorus compounds which may be used according to the present invention are those of the general formula

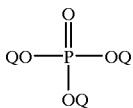

where Q are identical or different radicals, hydrocarbon radicals, such as alkyl, cycloalkyl, aryl, alkyl-substituted aryl or aryl-substituted alkyl, or halogen, hydrogen or a combination thereof, provided that at least one of the radicals Q is aryl.

Examples of such suitable phosphates are phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, bis(2-ethylhexyl) phenyl phosphate, tri (nonylphenyl) phosphate, phenyl methyl hydrogen phosphate, didodecyl p-tolyl phosphate, tricresyl phosphate, triphenyl phosphate, dibutyl phenyl phosphate and diphenyl hydrogen phosphate. The preferred phosphates are those in which each Q is aryl. The most preferable phosphate is triphenyl phosphate, triphenyl phosphine oxide and phenyl bistriphenyl phosphine oxide also being particularly preferred.

Furthermore, the combination of triphenyl phosphate with hexabromobenzene and antimony trioxide is preferred.

Other suitable flameproofing agents are compounds which contain phosphorus-nitrogen bonds, such as phosphonitrile chloride, phosphoric ester amides, phosphoric ester amines, phosphoramides, phosphonamides, phosphinamides, tris(aziridinyl)phosphine oxide or tetrakis-(hydroxymethyl)phosphonium chloride. These flame-retardant additives are for the most part commercially available.

Other suitable flameproofing agents are hydroxides of magnesium, which, if required, are coated with silane compounds.

Further halogen-containing flameproofing agents are tetrabromobenzene, hexachlorobenzene and hexabromobenzene and halogenated polystyrenes and polyphenylene ethers.

The halogenated phthalimides described in DE 19 46 924 may also be used. Among these, N,N'-ethylenebistetrabromophthalimide has become particularly important.

Antioxidants and heat stabilizers which may be added to the thermoplastic materials according to the invention are, for example, halides of metals of the first group of the Periodic Table, for example sodium, potassium or lithium halides, if necessary in combination with copper(I) halides, for example chlorides, bromides or iodides. Zinc fluoride and zinc chloride may also be used. Sterically hindered phenols, hydroquinones, substituted members of this group and mixtures of these compounds may also be used, preferably in concentrations of up to 1% by weight, based on the weight of the mixture.

Examples of UV stabilizers are various substituted resorcinols, salicylates, benzotriazoles and benzophenones, which are generally used in amounts of up to 2% by weight.

Materials for increasing the shielding against electromagnetic waves, such as metal flakes, metal powders, metal fibers or metal-coated fillers, may also be present.

Lubricants and mold release agents, which are added to the thermoplastic material as a rule in amounts of up to 1% by weight, are stearic acid, stearyl alcohol, alkyl stearates and stearamides and esters of pentaerythritol with long-chain fatty acids.

The additives include stabilizers which prevent the decomposition of red phosphorus in the presence of moisture and atmospheric oxygen. Examples are compounds of cadmium, of zinc, of aluminum, of silver, of iron, of copper, of antimony, of tin, of magnesium, of manganese, of vanadium, of boron, of aluminum and of titanium. Particularly suitable compounds are, for example, oxides of the stated metals, and carbonates or basic carbonates, hydroxides and salts of organic or inorganic acids, such as acetates or phosphates or hydrogen phosphates and sulfates.

The novel molding materials may contain, as a preferred stabilizer, at least one phosphorus-containing inorganic acid or a derivative thereof in an amount of up to 1000, preferably from 30 to 200, in particular from 50 to 130, ppm, based on the phosphorus content of the compounds.

Preferred acids are hydrophosphorous acid, phosphorous acid and phosphoric acid and salts thereof with alkali metals, sodium and potassium being particularly preferred. Organic derivatives of these acids are to be understood as meaning preferably ester derivatives of abovementioned acids with fatty acids, the fatty acids being of 12 to 44, preferably 22 to 40, carbon atoms. Examples are stearic acid, behenic acid, palmitic acid and montanic acid.

Various substituted resorcinols, salicylates, benzotriazoles and benzophenones may be mentioned as UV stabilizers, which are used in general in amounts of up to 2% by weight, based on the molding material.

Furthermore, organic dyes, such as nigrosine, and pigments, such as titanium dioxide, cadmium sulfide, cadmium selenide, phthalocyanines, ultramarine blue and carbon black, may be added as colorants.

Lubricants and mold release agents, which are usually used in amounts of up to 1% by weight, are preferably long-chain fatty acids (eg. stearic acid or behenic acid), salts thereof (eg. calcium or zinc stearate) or ester derivatives (eg. stearyl stearate or pentaerythrityl tetrastearate) and amide derivatives (eg. ethylene bisstearylamide).

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

Rubber

A rubber is defined as a polymer which increases the impact strength of polyphenylene ether and/or of polyamides. In specific cases, the rubber used as a component differs from the other components (a), (b), (c), (d) and (f) used. Suitable rubbers which increase the toughness of polyphenylene ethers are:
polyoctenylenes, graft rubbers having a crosslinked, elastomeric core, which is derived, for example, from butadiene, isoprene or alkyl acrylates, and a graft shell of polystyrene, and furthermore copolymers of ethylene and acrylates or methacrylates and the ethylene/propylene (EP) and ethylene/propylene/diene (EPDM) rubbers, and the EP or EPDM rubbers grafted with styrene.

Block copolymers having up to six, preferably up to four, identical or different blocks, which may be bonded either linearly or in a star-shaped manner (radio block copolymers) may also be used.

Blends of block copolymers having different structures, for example blends of two- and three-block copolymers or of hydrogenated and unhydrogenated block copolymers, may also be used.

Polymers toughened by the addition of the stated rubbers are known per se and are described in the literature. Merely by way of example, reference is made here to U.S. Pat. No. 4,085,163, U.S. Pat. No. 41,103, U.S. Pat. No. 3,149,182, U.S. Pat. No. 3,231,635 and U.S. Pat. No. 3,462,162. Appropriate products are also commercially available.

Rubbers which increase the toughness of polyamides generally have two essential features: they contain an elastomeric fraction which has a glass transition temperature of less than $-10°$ C., preferably less than $-30°$ C., and they contain at least one functional group capable of reacting with the polyamide. Suitable functional groups are, for example, carboxyl, carboxylic anhydride, carboxylic ester, carboxamido, carboximido, amino, hydroxyl, epoxy, urethane and oxazoline groups.

Examples of rubbers which increase the toughness of polyamides are:

EP and EPDM rubbers which have been grafted with the abovementioned functional groups. Suitable graft reagents are, for example, maleic anhydride, itaconic acid, acrylic acid, glycidyl acrylate and glycidyl methacrylate. These monomers may be grafted onto the polymer in the melt or in solution, in the presence or absence of a free radical initiator, such as cumyl hydroperoxide.

Copolymers of α-olefins may also be mentioned. The α-olefins are usually monomers of 2 to 8 carbon atoms, preferably ethylene and propylene. Alkyl acrylates and alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate, have proven suitable comonomers. Mixtures of different comonomers may also be used. Copolymers of ethylene with ethyl or butyl acrylate and acrylic acid and/or maleic anhydride have proven particularly suitable.

The copolymers can be prepared by a high pressure process at from 400 to 4500 bar or by grafting the comonomers on the poly-α-olefin. The α-olefin content of the copolymer is in general from 99.95 to 55% by weight.

A further group of suitable elastomers comprises core-shell graft rubbers. These are graft rubbers which are prepared in emulsion and comprise at least one hard and one soft component. A hard component is usually understood as meaning a polymer having a glass transition temperature of at least $25°$ C., and a soft component as meaning a polymer having a glass transition temperature of not more than $0°$ C. These products have a structure comprising a core and at least one shell, the structure being determined by the order of addition of the monomers. The soft components are derived in general from butadiene, isoprene, alkyl acrylates or alkyl methacrylates and, if required, further comonomers. Examples of suitable comonomers here are styrene, acrylonitrile and crosslinking or graft-linking monomers having more than one polymerizable double bond, such as diallyl phthalate, divinylbenzene, butanedioldiacrylate or triallyl (iso)cyanurate. The hard components are derived in general from styrene, α-methylstyrene and copolymers thereof, preferred comonomers here being acrylonitrile, methacrylonitrile and methyl methacrylate.

Preferred core-shell graft rubbers contain a soft core and a hard shell or a hard core, a first soft shell and at least one further hard shell. Functional groups, such as carbonyl, carboxyl, anhydride, amido, imido, carboxylic ester, amino, hydroxyl, epoxy, oxazoline, urethane, urea, lactam or halobenzyl groups, are incorporated here preferably by adding suitable functionalized monomers during the polymerization of the fmal shell. Suitable functionalized monomers are, for example, maleic acid, maleic anhydride, mono- or diesters of maleic acid, tert-butyl (meth)acrylate, acrylic acid, glycidyl (meth)acrylate and vinyl oxazoline. The amount of monomers having functional groups is in general from 0.1 to 25, preferably from 0.25 to 15, % by weight, based on the total weight of the core-shell graft rubbers. The weight ratio of soft to hard components is in general from 1:9 to 9:1, preferably from 3:7 to 8:2.

Such rubbers which increase the toughness of polyamides are known per se and are described, for example, in EP 0 208 187.

Blends of different rubbers may of course also be used.
Preparation of the Thermoplastic Molding Materials The novel thermoplastic molding materials, reinforced according to an embodiment, can be prepared by processes known per se, by mixing the starting components in a conventional mixing apparatus, such as an extruder, preferably a twin-screw extruder, a Brabender mill or a Banbury mill, and then extruding the mixture. After extrusion, the extrudate is cooled and comminuted.

Thorough mixing is advantageous for obtaining a very homogeneous molding material. The novel molding materials are usually prepared as described below:

The components (a) to (c), according to an embodiment (d), and, if desired (e) are generally melted and mixed at from 200 to $320°$ C., preferably from 250 to $300°$ C., in particular $280°$ C., in an extruder, roll mill or kneader, preferably a twin-screw extruder, during a residence time of from 0.5 to 10 minutes. Solutions of components (b), (a) and (c) or partial mixtures thereof may also be prepared and mixed, the solvents then removed by devolatilization and, according to an embodiment of the invention, the mixture is mixed with the reinforcing agent (d) and, if required, further additives (e) and compounded again. According to this embodiment, mixing of the components (a), (b) and (c) is preferably carried out in the presence, or with the addition, of the reinforcing agent (d). It is also possible to premix some or all of component (a) with at least one other component or with the reinforcing agent (d).

In a preferred process for the preparation of the thermoplastic molding materials, which are reinforced according to an embodiment of the invention, the components (a), (b), (c), (d) and, if required, (e) are mixed in an extruder at from 200 to $320°$ C., component (d) being coated with component (a) and the coated component (d) being introduced into an orifice of an extruder and being mixed in the extruder with the molten components (b) and (c) and, if desired, (e).

The novel molding material is particularly preferably prepared by the following method:

The functionalized polymer of component (a) is melted or dissolved and added directly to the glass roving of the reinforcing agent (d) or said roving is impregnated with the dispersion or solution and introduced together with the glass fibers into an orifice of the extruder and combined with the melt of components (b) and (c) and, if desired, (e), if required the solvent or dispersant being evaporated or being stripped off under reduced pressure.

Novel materials can also be prepared by a pultrusion process, as described in EP-A-56 703. In this process, the glass roving is impregnated with the polymer material and then cooled and comminuted. The glass fiber length in this case is identical to the granule length and is from 3 to 20 mm.

The residence times are in general from 0.5 to 50, preferably from 4 to 24, hours.

Thereafter, moldings can be produced from the molding materials, for example by means of conventional apparatuses for blow molding, profile extrusion and pipe extrusion or injection molding.

The thermoplastic molding materials prepared in this manner have a balanced property profile, in particular very good tensile strength and flowability in combination with good rigidity, in particular when the reinforcing agent (d) is used.

According to the invention, moldings, in particular injection molded articles, fibers, films and foils, consisting essentially of the molding materials described are therefore also provided.

Thermoplastic Molding Materials Containing Polyamide

We have found that the objects of the present invention are achieved by the thermoplastic molding material which is described in the claims, contains polyamide and, according to an embodiment, is reinforced.

Said molding material contains
- (a) from 0.1 to 40% by weight of at least one functionalized polymer, as defined in any of the polymer claims,
- (b) from 1 to 98.9% by weight of at least one polyphenylene ether,
- (c) from 0 to 97.9% by weight of at least one vinylaromatic polymer,
- (d) from 0 to 50% by weight of at least one reinforcing agent,
- (e) from 0 to 60% by weight of further additives and/or processing assistants and
- (f) from 1 to 98.9% by weight of at least one polyamide, the amounts of the components (a) to (f) together summing to 100% by weight.

Preferably, these novel thermoplastic molding materials contain 0.2–35, in particular 5–20, % by weight of component (a), 1–97.9, particularly preferably 20–80, in particular 25–50, % by weight of component (b), 0–50, in particular 0–30, % by weight of component (c), 1–50, particularly preferably 445, in particular 10–40, % by weight of component (d), 1–97.9, particularly preferably 0–30, in particular 0–20, % by weight of component (e) and 1–97.9, particularly preferably 15–75, in particular 30–60, % by weight of component (f).

The amounts of components (a) to (f) together always sum to 100% by weight.

The components (a) to (e) are as described above and are used in the amounts stated here.

The component (f) is described in more detail below.

Polyamides of Component (f)

Polyamides of component (f) may be thermoplastic semicrystalline polyamides. Semicrystalline polyamides are as a rule linear.

Such polyamides can be prepared, for example, by condensation of equimolar amounts of a saturated dicarboxylic acid of 4 to 12 carbon atoms with a diamine of 4 to 14 carbon atoms or by condensation of ω-aminocarboxylic acids or polyaddition of lactams.

Examples of suitable polyamides are polyhexamethyleneadipamide, polyhexamethyleneazelaamide, polyhexamethylenesebacamide, polyhexamethylenedodecanediamide, polytetramethyleneadipamide and the polyamides obtained by ring cleavage of lactams, such as polycaprolactam and polylaurolactam.

A polyamide (f) from the following group is particularly preferred: polytetramethyleneadipamide, polyhexamethyleneadipamide, polyhexamethylenesebacamide, polycaprolactam, copolyamides of terephthalic acid, hexamethylenediamine and ε-caprolactam, and copolyamides of terephthalic acid, isophthalic acid, hexamethylenediamine and, if desired, adipic acid, the amount of terephthalic acid and of hexamethylenediamine together being less than 50% by weight, based on the copolyamide. From this group, the polyhexamethyleneadipamide and polycaprolactam are particularly preferred. Mixtures of different polyamides may also be used.

In preferred thermoplastic molding materials, the difference between the amounts of terminal $NH_2$ and COOH groups in the polyamides used is less than 70, in particular less than 40, mmol/kg. Differences in terminal groups of from 10 to 30 mmol/kg are particularly preferred. These values are determined by known methods.

Polyamides having a viscosity number of from 40 to 250, in particular from 40 to 150, ml/g, measured according to DIN 53426, are preferably used.

Low molecular weight polyamides or polyamide prepolymers can be prepared, for example, by the processes described in EP 0 129 195, EP 0 129 196 and EP 0 299 444. Further batchwise and continuous preparation processes are known to a person skilled in the art.

In a preferred procedure, the low molecular weight polyamide is passed in molten form through a discharge zone with simultaneous removal of the residual water contained in the melt. Suitable discharge zones are, for example, devolatilization extruders. The melt freed from water in this manner is then extruded and the extrudates granulated. The granules obtained are melted at about 20° C. above their melting point (in the case of polyhexamethyleneadipamide at about 280° C.), preferably in a twin-screw extruder, mixed with the functionalized polymer, the polyphenylene ether and, if required, the rubber, the additives or processing assistants and extruded, and the extrudate is cooled and granulated.

The novel thermoplastic molding materials which contain polyamide may be free of vinylaromatic polymers. According to an embodiment of the invention, however, they may contain 0–97.9, preferably 0–50, in particular 0–35, % by weight of at least one vinylaromatic polymer (component (c)). They may thus be polyphenylene ether/polyamide blends or polyphenylene ether/polyamide/vinylaromatic blends.

The novel thermoplastic molding materials may be prepared by processes known per se, as described above for the reinforced thermoplastic molding materials, except that in this case a polyamide is used as further component (f), and component (c) can be dispensed with according to an embodiment.

According to an embodiment of the invention, the components (a) to (e) are mixed, preferably in an extruder, and component (f) is then metered into the mixture of components (a) to (e), preferably in heated form in a side extruder. Any reinforcing agents (d) present, which, according to an embodiment of the invention, may be precoated with (a), can be incorporated into the first mixture or metered in together with the polyamide (f).

The thermoplastic molding materials thus prepared have a balanced property profile, in particular a very good toughness/rigidity ratio, in particular when the reinforcing agent (d) is used.

According to the invention, moldings, fibers, films and foils of the thermoplastic molding materials are also provided and can be produced by the process described below.

The Examples which follow illustrate the invention with reference to reinforced molding materials.

EXAMPLES

Example 1

The functionalized styrene polymer component (a) having an average polystyrene molecular weight of 30,000 and terminal anhydride group (a1) was used. A second functionalized component (a) had an average polystyrene molecular weight of 90,000 and a terminal anhydride group (a2). A third functionalized component (a) had an average polystyrene molecular weight of 30,000 and a terminal primary amino group (a3). The styrene polymers were prepared as described below.

The polymer (a1) was prepared as follows: 3200 ml of dry cyclohexane and 0.3 ml of 1,1-diphenylethylene were initially taken in a blanketed 6 l stirred kettle. Thereafter, 1.5 mol of secondary butyllithium solution (in 92/8 cyclohexane/isopentane) were added until a red color persisted. A further 16 ml of butyllithium solution were then added. Thereafter, 800 ml of highly pure styrene were added dropwise at 60° C. in the course of 2 hours. After stirring had been carried out for a further hour, 7 ml of 1,1-diphenylethylene were added, after which stirring was continued for a further half hour and finally the mixture was cooled to 20° C. In the meantime, 30 g of trimellitic anhydride chloride in 300 ml of dry tetrahydrofuran were initially taken in a further blanketed 6 l stirred kettle and cooled to 0C. The content of the first stirred kettle was then added dropwise in the course of from 1 to 2 hours. After a subsequent reaction time of 1 hour, the resulting styrene polymer was precipitated with petroleum ether, filtered off under suction and dried. The anhydride-modified polymer thus prepared had an average molecular weight (GPC in CHCl$_3$ against polystyrene calibration standards) of 30,000 ($M_n$).

The polymer (a2) was prepared in the same manner, but with 6 instead of 16 ml of a 1.5 molar secondary butyllithium solution as initiator. The average molecular weight of the resulting styrene polymers was 90,000 ($M_n$).

The polymer (a3) was prepared in the same manner as the polymer (a1). The product was dissolved in 5 l of cyclol. 20 g of 1,4-diaminobutane were then added and stirring was then carried out for 4 hours at 120° C. After cooling, the product was precipitated in methanol, isolated and dried. The average molecular weight of the resulting styrene polymer modified with a primary amine was 30,000 ($M_n$).

The degree of functionalization of the functionalized polymers (a1), (a2) and (a3) was determined by $^1$H-NMR.

The following degrees of functionalization were obtained:
(a1) 94%
(a2) 90%
(a3) 96%

Poly-2,6-dimethyl-1,4-phenylene ether having an intrinsic viscosity of 0.55 dl/g, measured at a concentration of about 1% by weight in chloroform at 25° C., was used as component (b).

Three polystyrenes were used as component (c):
(c1) is a high impact polystyrene KR2756 from BASF AG, containing 8% by weight of butadiene and having a melt flow index of 3 g/10 minutes, measured according to DIN 53735 at 200° C. and 5 kg load.
(c2) is a general purpose polystyrene 148 H from BASF AG, having the following properties:
VST/B/50(ISO 306)=101° C.
MVR 200/5(ISO 1133)=4.5
(c3) is a copolymer of 95% by weight of styrene and 5% by weight of tert-butyl acrylate, having a viscosity number of 1.0 dl/g. It was prepared by the process described in EP-A-0 319 833 for component B (cf. page 6, line 57 et seq.).

The following glass fibers were used as component (d):

A chopped glass fiber which had a mean fiber diameter of 40 μm and an aminosilane size was used as component (d1), said fiber being obtainable, for example, under the name OCF$^R$R 44DX2 from Owens Corning Fiberglass Corp.

The chopped glass fiber 5145EC14 from Vetrotex International S.A., which had a diameter of 1 μm and a silane size, was used as component (d2).

Preparation of the Molding Materials

The components (a), (b), (c) and (d) were compounded using the parts by weight stated in Table 1, in all 7 examples in a twin-screw extruder operated at 200 rpm. The temperature was 280° C. The molding material was granulated after extrusion and finally processed to the corresponding moldings by injection molding method at 280° C.

The flowability (melt volume rate, MVR 250° C./21.6 kg), measured according to DIN 53 735, the tensile strength, measured according to DIN 53 455, and the modulus of elasticity, measured according to DIN 53 457, are shown in Table 2.

Examples 2, 3, 4 and 6 related to reinforced thermoplastic molding materials which are prepared according to the invention and contain a functionalized styrene polymer (a), and Examples 1, 5 and 7 are comparative materials without the functionalized styrene polymer (a).

TABLE 1

Compositions (in % by weight) of the novel Examples and Comparative Experiments (=*)

| | Component a | Component b | Component c | Component d |
|---|---|---|---|---|
| 1* | — | 35 b1 | 20 c1<br>15 c2 | 30 d1 |
| 2 | 5 a1 | 35 b1 | 20 c1<br>10 c2 | 30 d1 |
| 3 | 5 a2 | 35 b1 | 20 c1<br>10 c2 | 30 d1 |
| 4 | 5 a3 | 35 b1 | 20 c1<br>10 c2 | 30 d1 |
| 5* | — | 35 b1 | 20 c1<br>10 c2<br>5 c3 | 30 d2 |
| 6 | 5 a1 | 40 b1 | 25 c1<br>10 c2 | 20 d2 |
| 7* | — | 40 b1 | 25 c1<br>15 c2 | 20 d2 |

TABLE 2

Properties of the novel Examples and Comparative Experiments

| | MVR [ml/10 min] | Modulus of elasticity [N/mm$^2$] | Tensile strength [N/mm$^2$] |
|---|---|---|---|
| 1* | 15 | 8600 | 119 |
| 2 | 23 | 9150 | 131 |
| 3 | 20 | 9400 | 138 |
| 4 | 22 | 9250 | 135 |
| 5* | 12 | 8800 | 122 |
| 6 | 34 | 7150 | 120 |
| 7* | 25 | 6700 | 108 |

The table shows that the novel reinforced thermoplastic molding materials simultaneously have good flowability, high tensile strength and a high modulus of elasticity in contrast to the comparative polymers, which have poor flowability, lower tensile strength and a lower modulus of elasticity.

In the molding materials according to Examples 1 to 5, an identical composition of components (b) and (d) was used, while in the materials of Comparative Examples 1 and 5 the amount of component (c) was increased by an amount corresponding to that of component (d) in the novel materials according to Examples 2 to 4. Thus, the functionalized polystyrene was replaced by the high impact polystyrene in Comparative Example 1 and by a styrene copolymer in Comparative Example 5. The properties of the materials shown in Table 2 show that the novel materials according to Examples 2 to 4 have considerably improved flowability compared with the materials of Comparative Examples 1 and 5 and also possess substantially improved modulus of elasticity and improved tensile strength.

A different composition of the components (b) and (d) was used in the materials according to Examples 6 and 7, the novel functionalized polystyrene of component (a) being used in Example 6 and, on the other hand, once again a correspondingly increased amount of component (c) being used in the material according to Comparative Example 7. From the results shown in Table 2, it is clear that the novel molding material has higher values for the flowability, the modulus of elasticity and the tensile strength.

The properties of the novel molding materials are thus clearly superior to the properties of the prior art comparative materials.

Example 2

For comparison purposes, a functionalized styrene polymer component (a4) was prepared by the direct functionalization process described by Park, Barlow and Paul. This comparative polymer had the following properties:

Terminal group: Trimellitic anhydride;

Polystyrene molecular weight: 30,000;

Degree of functionalization: 63%

The degree of functionalization was determined by $^1$H-NMR spectroscopy, as described by Park, Barlow and Paul.

Preparation of the Molding Materials

The components (a), (b), (c) and (d), as stated above or in Example 1, were prepared as described in Example 1, using the parts by weight stated in Table 3.

TABLE 3

|   | Component a | Component b | Component c | Component d |
|---|---|---|---|---|
| 8* | 5 a4 | 50 b1 | 30 c1<br>5 c2 | 10 d1 |
| 9 | 5 a2 | 50 b1 | 30 c1<br>5 c2 | 10 d1 |

The flowability, the tensile strength and the modulus of elasticity were determined as stated in Example 1 and are shown in Table 4.

TABLE 4

|   | MVR [ml/10 min] | Modulus of elasticity [N/mm$^2$] | Tensile strength [N/mm$^2$] |
|---|---|---|---|
| 8* | 36 | 5530 | 125 |
| 9 | 35 | 5605 | 135 |

The table shows that the thermoplastic molding material reinforced according to the invention has flowability very similar to that of the corresponding molding material prepared using the polystyrene directly functionalized according to the prior art, the tensile strength and the modulus of elasticity being greater than in the case of the comparative mixture.

Example 3

For comparison purposes, functionalized styrene polymer components (a) were prepared by the indirect functionalization method described by Park, Barlow and Paul, using ethylene oxide. These comparative polymers of the functionalized styrene polymer component (a) had the following properties:

TABLE 5

|   | a5* | a6* | a7* |
|---|---|---|---|
| Terminal group | anhydride | anhydride | primary amine |
| Polystyrene molecular weight | 30,000 | 90,000 | 30,000 |
| Degree of functionalization [%] | 80 | 70 | 40 |

Trimellitic anhydride was used as the anhydride group. The primary amine used for the synthesis was 1,4-diaminobutane.

The degree of functionalization was determined by means of $^1$H-NMR spectroscopy, as described by Park, Barlow and Paul.

Preparation of the Molding Materials

The components (a), (b), (c) and (d), as stated above or in Example 1, were prepared as described in Example 1, using the parts by weight stated in Table 6.

TABLE 6

|   | Component a | Component b | Component c | Component d |
|---|---|---|---|---|
| 10* | 5 a5* | 35 b1 | 20 c1<br>10 c2 | 30 d1 |
| 2 | 5 a1 | 35 b1 | 20 c1<br>10 c2 | 30 d1 |
| 11* | 2 a7* | 33 b1 | 20 c1<br>10 c2<br>5 c3 | 30 d2 |
| 12 | 2 a3 | 33 b1 | 20 c1<br>10 c2<br>5 c3 | 30 d2 |
| 13* | 10 a6* | 40 b1 | 25 c1<br>5 c2 | 20 d2 |
| 14 | 10 a2 | 40 b1 | 25 c1<br>5 c2 | 20 d2 |

The flowability, the tensile strength and the modulus of elasticity were determined as stated in Example 1 and are shown in Table 7.

TABLE 7

|   | MVR [ml/10 min] | Modulus of elasticity [N/mm$^2$] | Tensile strength [N/mm$^2$] |
|---|---|---|---|
| 10* | 23 | 9048 | 117 |
| 2 | 23 | 9150 | 131 |
| 11* | 28 | 8700 | 93 |
| 12 | 26 | 8943 | 102 |
| 13* | 34 | 7726 | 121 |
| 14 | 34 | 7308 | 126 |

The table shows that the novel reinforced thermoplastic molding materials have flowability identical or very similar to that of the corresponding molding materials prepared using polystyrenes indirectly functionalized according to the prior art, the tensile strength and the modulus of elasticity being greater than in the case of the comparative mixtures.

We claim:

1. A process for preparing a functionalized polymer of the formula

A—Z—X where
  A is a block of vinylaromatic monomers of 8 to 20 carbon atoms,
  Z is a basic building block comprising a compound having sterically hindering groups and
  X is a basic building block functionalized with a terminal acid anhydride group, wherein the degree of functionalization of the polymer is at least 65%, wherein
    a) vinylaromatic monomers are subjected to anionic polymerization to give a first living polymer of the formula A⁻ containing a block A,
    b) the first living polymer is reacted with a compound having sterically hindering groups to give a second living polymer of the formula A—Z⁻ and
    c) the second living polymer is reacted with a functional group of a difunctional or polyfunctional compound to give a compound of the formula A—Z—X.

2. A process as claimed in claim 1, having one or more of the following features:
  A is a block of styrene or α-methylstyrene,
  Z is a basic building block of the formula

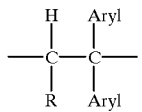

where R is a hydrogen radical or hydrogen and aryl is aryl of 6 to 10 carbon atoms.

3. A functionalized polymer of the formula

where
  A is a block of vinylaromatic monomers of 8 to 20 carbon atoms,
  Z is a basic building block of the formula

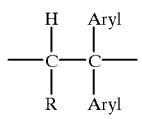

where R is a hydrocarbon radical or hydrogen and aryl is aryl of 6 to 10 carbon atoms, and
  X is a basic building block, functionalized with a terminal acid anhydride group, wherein the degree of functionalization of the polymer is at least 90%.

4. A functionalized polymer as claimed in claim 3, wherein A is a block of styrene or α-methylstyrene.

5. Method of using of a functionalized polymer as claimed in claim 3 for the preparation of unreinforced or reinforced, thermoplastic molding materials.

6. A thermoplastic molding material containing
  (a) from 0.1 to 20% by weight of at least one functionalized polymer, as defined in claim 3,
  (b) from 1 to 98.9% by weight of at least polyphenylene ether,
  (c) from 1 to 98.9% by weight of at least one vinylaromatic polymer,
  (d) from 0 to 50% by weight of at least one reinforcing agent and
  (e) from 0 to 60% by weight of further additives and/or processing assistants,
the amounts of components (a) to (e) together summing to 100% by weight.

7. A process for the preparation of an unreinforced or reinforced, thermoplastic molding material as claimed in claim 6, wherein the components (a), (b), (c) and optionally (d) and/or (e) are mixed in an extruder at from 200 to 320° C., if required, component (d) being coated with component (a) and the coated component (d) being introduced into an orifice of an extruder and being mixed in the extruder with the molten components (b) and (c) and, if desired, (e).

8. A thermoplastic molding material containing
  (a) from 0.1 to 40% by weight of at least one functionalized polymer, as defined in claim 3,
  (b) from 1 to 98.9% by weight of at least one polyphenylene ether,
  (c) from 0 to 97.9% by weight of at least one vinylaromatic polymer,
  (d) from 0 to 50% by weight of at least one reinforcing agent,
  (e) from 0 to 60% by weight of further additives or processing assistants and
  (f) from 1 to 98.9% by weight of at least one polyamide,
the amounts of the components (a) to (f) together summing to 100% by weight.

9. A process for the preparation of an unreinforced or reinforced thermoplastic molding material as claimed in claim 8, wherein the components (a), (b) (f) and optionally (c), (d) and/or (e) are mixed in an extruder at from 200 to 320° C., component (f) being introduced into an orifice of an extruder and being mixed in the extruder with the molten components (a), (b), (c) and (e) and it being possible to mix component (d) with component (f) or with components (a), (b), (c) and (e).

10. Method of using of a thermoplastic molding material as claimed in claim 6 for the production of moldings, fibers and foils.

11. A molding, fiber or foil comprising a molding material as claimed in claim 6.

12. A process as claimed in claim 1, wherein A is a block of vinylaromatic monomers of 8 to 12 carbon atoms.

13. A process as claimed in claim 2, wherein R is an alkyl of 1 to 4 carbon atoms or hydrogen.

14. A functionalized polymer as claimed in claim 3, wherein A is a block of vinylaromatic monomers of 8 to 12 carbon atoms.

15. A functionalized polymer as claimed in claim 3, wherein R is an alkyl of 1 to 4 carbon atoms or hydrogen.

16. A functionalized polymer as claimed in claim 3, wherein
  A is a block of styrene or α-methylstyrene, and
  R is an alkyl of 1 to 4 carbon atoms or hydrogen.

17. A thermoplastic molding material as claimed in claim 6, wherein
  A is a block of vinylaromatic monomers of 8 to 12 carbon atoms, and
  R is an alkyl of 1 to 4 carbon atoms or hydrogen.

* * * * *